UNITED STATES PATENT OFFICE.

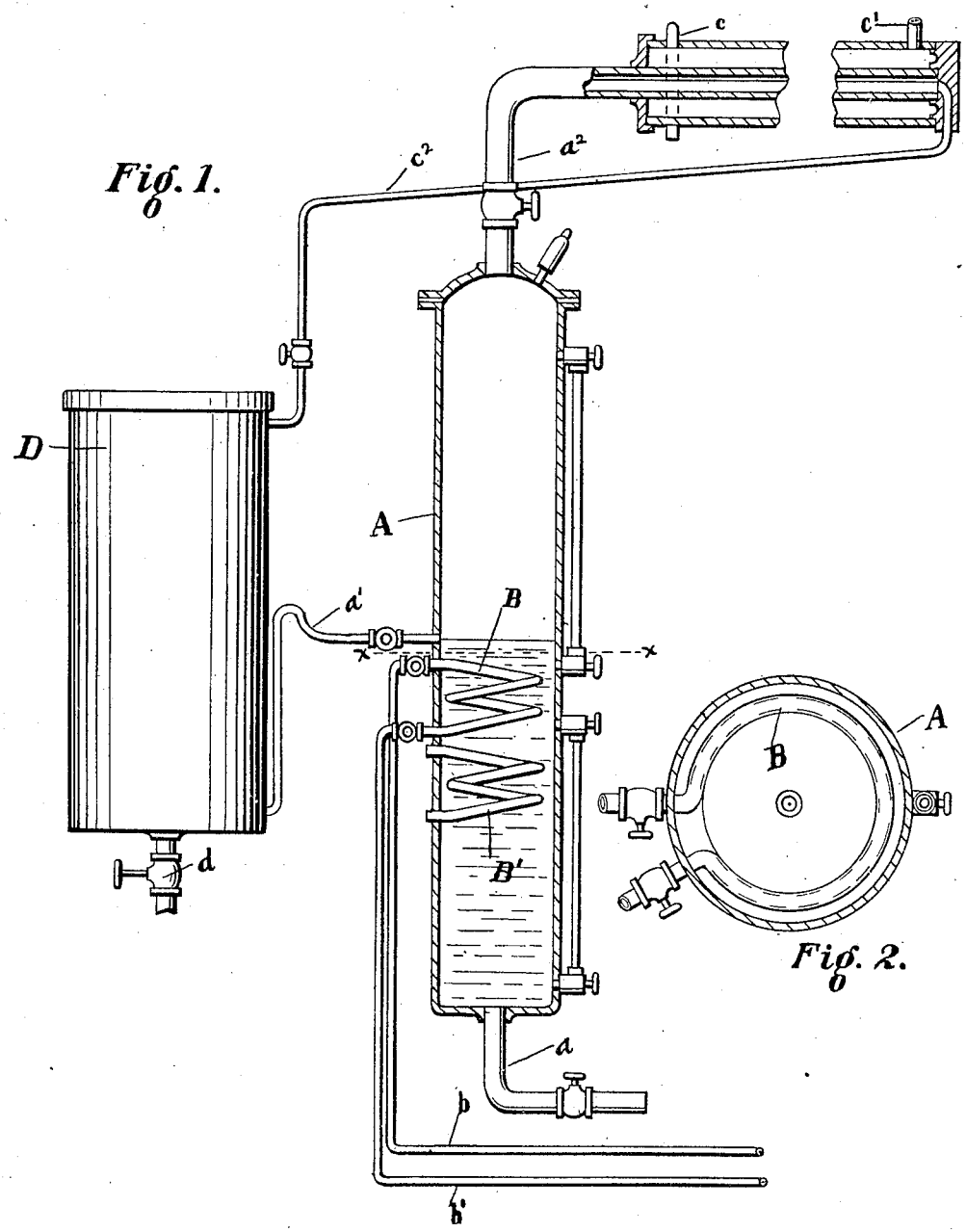

JOHN URI LLOYD, OF NORWOOD, OHIO.

PROCESS OF PURIFYING VOLATILE SUBSTANCES.

No. 869,375.        Specification of Letters Patent.        Patented Oct. 29, 1907.

Application filed August 15, 1904. Serial No. 220,747.

*To all whom it may concern:*

Be it known that I, JOHN URI LLOYD, a citizen of the United States of America, and resident of Norwood, county of Hamilton, State of Ohio, have invented certain new and useful Improvements in Processes of Purifying Volatile Substances, of which the following is a specification.

My invention relates to a process for separating desirable, volatile substances, from less desirable, less volatile ones, and is especially intended for use in purifying high wines from fusel oil and other impurities.

In the accompanying drawings I have illustrated an apparatus for use in carrying out my process.

Figure 1 is a view partly in vertical section and partly in elevation of such an apparatus. Fig. 2 is a view upon line $x$—$x$ of Fig. 1 upon a slightly enlarged scale.

I will first describe the apparatus.

Referring to the parts: Within tank, A, is a heating coil, B, which is connected to a steam pipe, $b$, and an exhaust pipe, $b'$. Below heating coil, B, is a cooling coil, B', into which a cooling medium such as cold water, is to be admitted. In the bottom of the tank, A, is a discharge pipe, $a$, and upon its side an admission pipe, $a'$. From the top of tank, A, an enlarged pipe, $a^2$, leads into condenser, C, which is supplied with a cooling medium through pipe, $c$, the same being discharged by pipe, $c'$. From the condenser, C, a pipe, $c^2$, leads into a tank, D.

In carrying on my process, the mixture to be purified is admitted to tank, A, through pipe, $a'$, to a height such as to submerge the heating coil, B. Then steam is admitted to coil, B, so as to bring the surface of the liquid to the temperature at which the substance, to be purified, volatilizes, as for instance with alcohol to the temperature of 175 degrees F., at the same time cold water, or some other cooling medium, is admitted through pipe, D'. In the case of purifying alcohol it is preferable to have the cold water passing through the pipe, B', at a temperature of about fifty degrees Fahrenheit. This causes the more volatile substances to be evaporated, and to rise through pipe, $a^2$, into the condenser, C, where they are condensed and carried back through pipe, $c^2$, into the tank, D, forcing fresh material from tank, D, through pipe, $a'$, into tank, A, keeping coil, B, covered. Thus the process is a continuous one and eventually the substance remaining in tank, D, will be that free from undesirable elements, which will have accumulated in tank, A. The first evaporation may not separate all of the impurities, depending upon the degree of volatility of the impurity. For instance, in the case of mixture of alcohol and fusel oil, when the alcohol is carried over by the first evaporation, a fraction of the fusel oil will be likewise carried over, therefore making it necessary to return the substance to the tank, A. In the next evaporation there would be a smaller amount of the fusel oil carried over and the process will be carried on until a test of the substance showed that the excess of fusel oil had been separated.

In high wines the undesirable elements, such as fusel oil and other impurities, are heavier and less volatile than the desirable constituents. Therefore, in my process, as the evaporation of the more volatile bodies takes place near the surface, they arise in the form of vapors while the cooling coil, B', keeps the heavier substances and those of greater boiling points at a temperature such that they do not evaporate perceptibly and as the alcohol is evaporated, they sink by gravity and accumulate below pipe, B'. These heavier substances accumulated in the bottom of the tank, A, may be drawn off through pipe, $a$, at intervals and fresh material to be purified be admitted to tank, A and the desirable elements that rise into the condenser and are thence conveyed into the tank, D, may be drawn off through cock, $d$.

It is obvious that my process can be applied likewise to other mixtures in which there are volatile and less volatile substances.

What I claim is:

The hereindescribed process of separating high wines from fusel oil and similar impurities, consisting in heating the mixture at the surface to vaporize and carry off the desirable constituents, and keeping the body of the liquid cool to retain the fusel oil and other impurities in their liquid state.

JOHN URI LLOYD.

Witnesses:
    W. F. MURRAY,
    A. McCORMACK.